United States Patent Office 3,567,390
Patented Mar. 2, 1971

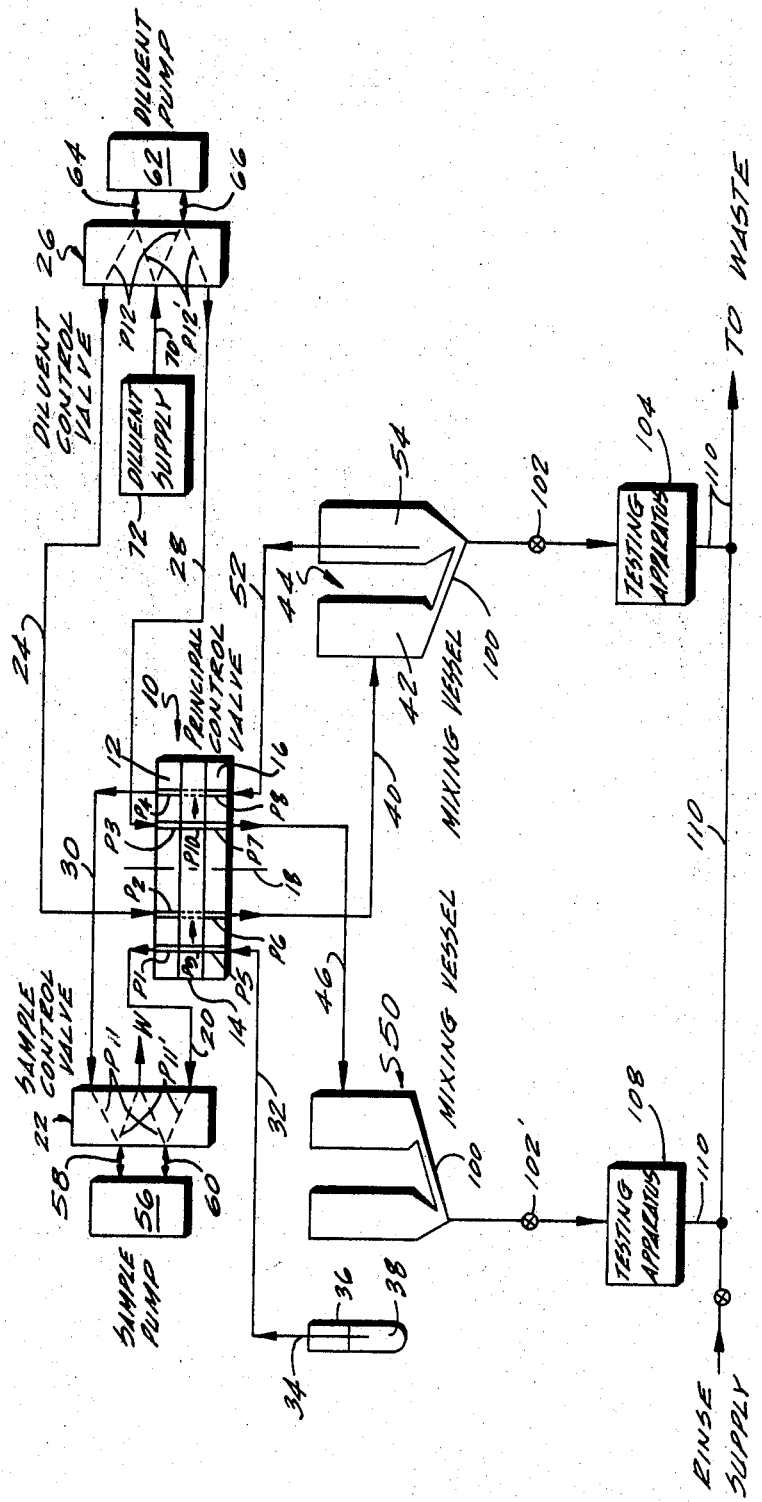

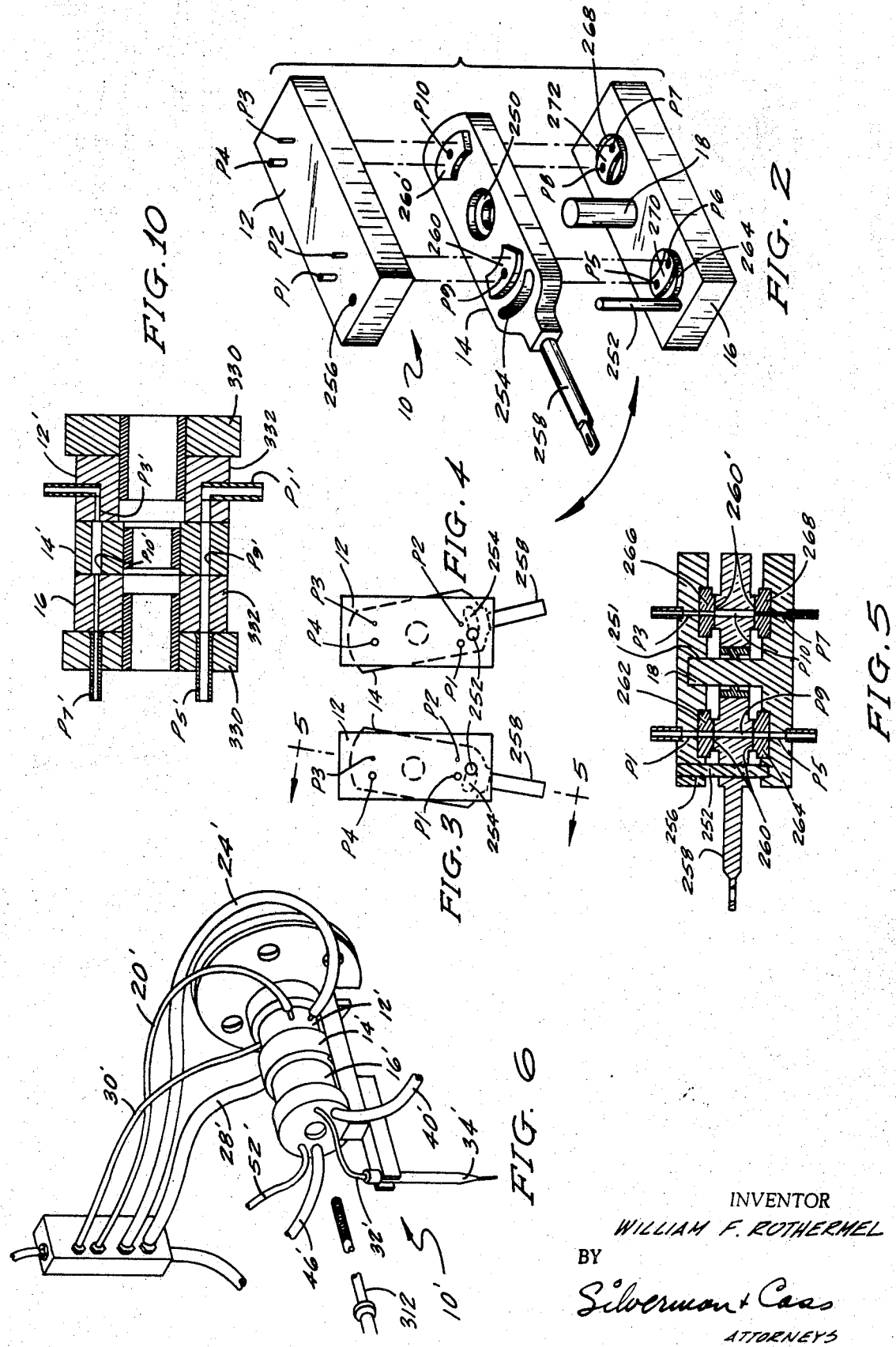

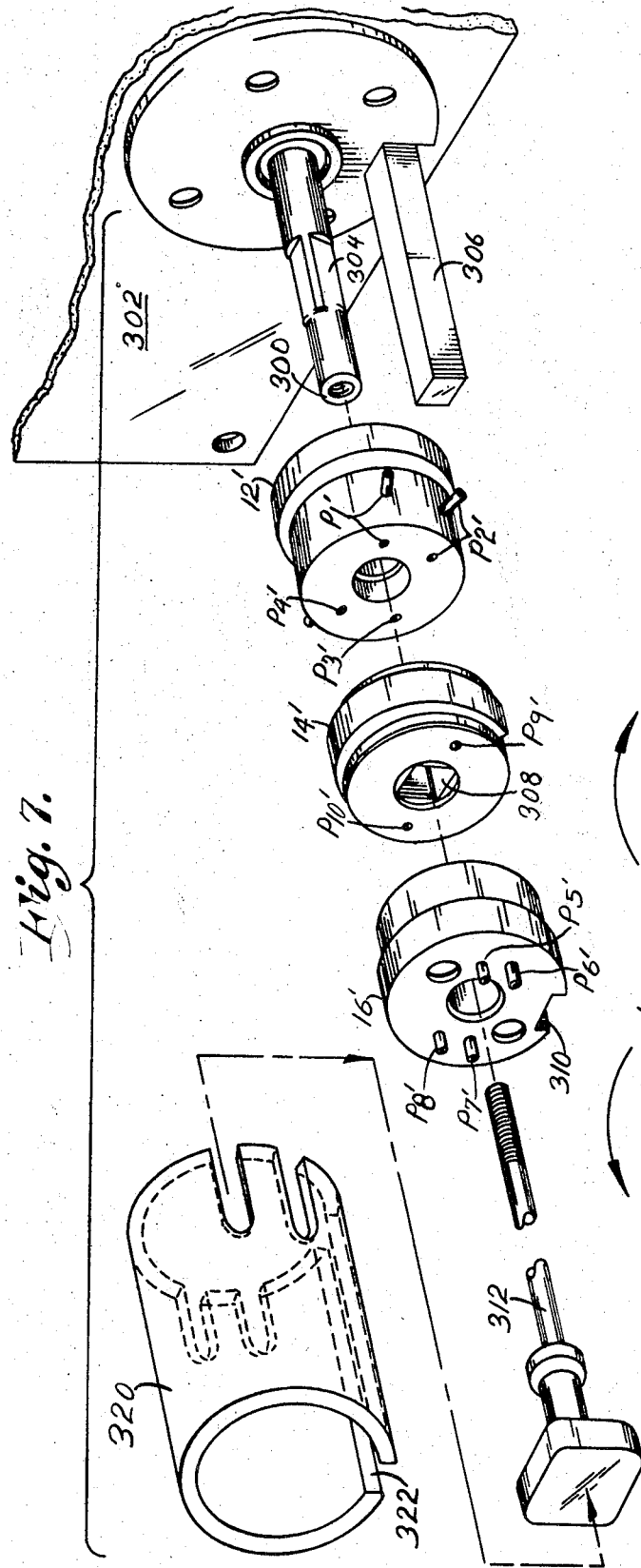

3,567,390
FLUID TRANSFER VALVE STRUCTURE AND DILUTING SYSTEM
William F. Rothermel, Hialeah, Fla., assignor to Coulter Electronics, Inc., Hialeah, Fla.
Continuation-in-part of application Ser. No. 631,284, Apr. 17, 1967. This application Apr. 3, 1968, Ser. No. 718,605
Int. Cl. G01n 1/00
U.S. Cl. 23—253                         15 Claims

ABSTRACT OF THE DISCLOSURE

A diluting system for automatically producing one or more sample suspensions or dilutions of predetermined concentration from a first fluid specimen, while simultaneously commencing dilution of a second fluid specimen before the desired dilutions of the first are completed; and a novel transfer valve structure for use therein. The system employing means for drawing a fluid sample into a first portion of the transfer valve, wherein upon indexing of the valve a precise amount of said sample is subtended and mixed with a known quantity of diluent to provide a first fluid suspension of known concentrate. Means for drawing a portion of the first fluid suspension into a second portion of the valve, such that upon indexing of the valve back to its initial position, a precise amount of said first fluid suspension is subtended and mixed with a second volume of diluent to produce a second or final fluid suspension of determinable concentrate.

CROSS-REFERENCE TO RELATED APPLICATION

This is a continuation-in-part of a copending application filed in the name of the applicant and Robert I. Klein, Ser. No. 631,284 on Apr. 17, 1967, entitled Automatic Apparatus for Processing of Blood or the Like To Obtain Certain Parameters. The portion of the said copending application which is common with this application is the sole invention of the applicant herein.

BACKGROUND OF THE INVENTION

The field of the invention herein is broadly that which uses vessels, valves and connecting conduits for the intermixing and/or diluting of fluids primarily for the purpose of making measurements and tests on said fluids. It will be appreciated that this description is somewhat general, however, while the apparatus disclosed in this specification is primarily for use with an automatic instrument such as disclosed in the above identified copending application which employs the Coulter particle analyzing principle disclosed in U.S. Patent No. 2,656,508, it is capable of many uses. In medicine, biology, chemistry and allied fields, research as well as routine testing requires the use of apparatus which can produce fluid mixtures of specific concentrations accurately and automatically, viz, one part fluid sample to a predetermined quantity of diluent or chemical substance.

In recent years so-called automatic chemistry apparatus has become popular, especially where testing and measurements are to be done on a continuous production basis, with many tests to be made simultaneously and complex routines to be repeated, but with different samples. The copending application which has been identified above is of this type, and it is primarily intended for the measurement of parameters of blood.

In that apparatus, samples of whole blood may be introduced, one every fifteen seconds, and the apparatus performs the requisite dilutions, tests and computations needed for obtaining blood counts of white and red cells, a hematocrit determination, a hemoglobin measurement, and so on. Thus, an automatic instrument is required which can quickly and accurately prepare the necessary sample suspensions of predetermined concentration for transfer to the testing apparatus of the instrument. In the case of blood sampling, multiple dilutions must be made, red cells must be lysed for making white cell determinations, liquids must be pumped, transferred and moved between vessels. The manual techniques which are classicially used in conventional work are not satisfactory, and obviously the vessels and equipment of the ordinary laboratory are not suitable for automated apparatus.

The above identified parent application is directed primarily to the overall automatic instrument, and, for the purpose of completeness, discloses a diluting arrangement which is the subject matter of the present invention. In the specific field of use treated in said patent application, and in other related fields it is often desirable and necessary to perform successive tests on a fluid sample, the respective tests requiring sample suspensions of different or varying concentration, viz, the ratio of original sample to diluent.

According to the invention, an important object is the provision of diluting apparatus which can prepare sample suspension of predetermined concentrations automatically and accurately.

Another object of the invention is to provide diluting apparatus which will prepare a first sample suspension automatically and accurately, and thereafter is capable of performing a second diluting operation on said first suspension to produce a second sample suspension of predetermined concentration.

Still another object of the invention is the provision of a novel valve construction for use in the above mentioned diluting system.

BRIEF DESCRIPTION OF THE DRAWINGS

FIG. 1 is a schematic block or flow diagram of a diluting system which embodies the invention coupled with testing apparatus.

FIG. 2 is an exploded perspective view of one embodiment of the transfer valve assembly used in conjunction with the present invention.

FIGS. 3 and 4 are top plan views showing the two positions of the center plate of the transfer valve assembly of FIG. 2.

FIG. 5 is a sectional view taken generally along the line 5—5 of FIG. 3 and in the indicated direction.

FIG. 6 is a perspective view of a second transfer valve assembly which is an embodiment alternate to that of FIGS. 2–5.

FIG. 7 is an exploded perspective view of the embodiment of FIG. 6.

FIGS. 8 and 9 are somewhat diagrammatic plan views showing the two positions of the center member of the transfer valve embodiments of FIGS. 6 and 7.

FIG. 10 is a median sectional view taken through the valve elements of FIG. 7, in the position represented by FIG. 8.

DESCRIPTION OF PREFERRED EMBODIMENTS

At the outset it would be convenient to outline the general scheme of the system of the instant invention by explaining he functions which are performed.

A fluid sample is obtained in any convenient manner. A tube or snorkle is dipped into the sample and draws a quantity into the fluid transfer valve of the system. A minute measured part of the sample is then diluted with a predetermined quantity of diluent. The resulting suspension is then transferred to first testing apparatus of the automatic instrument wherein one or more tests or operations may be performed thereon. After the first test or series of tests are performed, a portion of the sample solution is again drawn into the fluid transfer valve and a second diluting operation is performed by introduction of a predetermined quantity of diluent. The resulting suspension is then transferred to second testing apparatus wherein the required tests etc. are performed.

In the embodiment of the invention disclosed in the aforementioned parent application two diluting operations are employed and the resulting suspensions are tested by apparatus operating on the Coulter principle. It should be understood that with regard to the instant invention this is merely by way of illustration, and does not so limit the present invention.

Looking now at FIG. 1, the diagram illustrates the diluting system connected with testing apparatus. The control or transfer valve for the careful measurement of the sample is shown at the top left of the diagram and is designated generally by the reference character 10. It is formed of three elements 12, 14 and 16 with the center element 14 sandwiched between the two outer elements but swingable relative thereto in a manner to be described in detail, to align certain passageways.

The sandwiched or central element 14 is a carefully made and highly accurate structure having conduits P–9 and P–10, each on opposite sides of a central pivot about which it is adapted to swing. Each of these conduits is designed to carry a precise quantity or volume of some fluid, and upon movement between positions, there being two such positions, will slice off or subtend within itself the said volume of fluid and pass it or transfer it. This function is represented by the arrows showing the alignment of the center conduits with others carried by the sandwiching members 12 and 16 of the valve 10.

The outer members 12 and 16 are fixed relative to one another, and each member has two pairs of ports or passageways. These are designated P1, P2, P3 and P4 in member 12, and P5, P6, P7 and P8 in member 16. When the center element 14 is in one position, say the first, the left hand conduit or passageway P9 is aligned with the passageways P1 and P5 at the same time that the right hand conduit or passageway P10 is aligned with the passageways P3 and P7. If the center element or member 14 is swung upon the pivot designated symbolically by the broken line 18, to the second position, the passageways P9 and P10 will move to the positions shown by the broken lines in the direction indicated by the arrows, that is, to the right in FIG. 1, blocking off further flow between the passageways P1 and P5 and between the passageways P3 and P7, while aligning the passageway P9 with the passageways P2 and P6 and aligning the passageway P10 with the passageways P4 and P8.

This action can be reversed, and its effect is to slice or subtend a precise volume of fluid out of the one path and enable it to be inserted into the other path while blocking off the first path. This is done at both ends of the transfer valve 10, which, for purposes of clarity must be distinguished from the sample and diluent control valves to be discussed hereinafter. Accordingly, it can be seen that transfer valve 10 is comprised of two portions of like construction, one being to the right of line 18 and the other to the left.

Various fluid lines connect the valve assembly 10 with the other elements of the system and for purposes of reference they are as follows:

(1) Fliud line 20 connects from passageway P1 to the bottom end of the sample control valve 22.

(2) Fluid line 24 connects from the passageway P2 to the upper end of the diluent control valve 26.

(3) Fluid line 28 connects from the passageway P3 to the lower end of the diluent control valve 26.

(4) Fluid line 30 connects from the passageway P4 to the upper end of the sample control valve 22.

(5) Fluid line 32 connects from the passageway P5 to the sample snorkle 34. Note that this snorkle is shown dipping into a vessel 36 containing a liquid sample 38, the vessel 36 being any suitable construction, preferably with some form of identification.

(6) Fluid line 40 connects from the passageway P6 to chamber 42 of the mixing vessel 44.

(7) Fluid line 46 connects from the passageway P7 to chamber 48 of vessel 50.

(8) Fliud line 52 connects from the passageway P8 to the chamber 54 of vessel 44. This line is sometimes called a thief.

Looking for the moment at the overall system disclosed it will be noted that there is sample pump 56 connected by the lines 48 and 60 to the sample control valve 22, and a diluent pump 62 connected by the lines 64 and 66 to the diluent control valve 26. Both of the control valves 22 and 26 are three-way valves, with the internal alternate paths being shown schematically by slanted arrows. The path pairs are P11 and P11' in the valve 22 and the pairs P12 and P12' in the valve 26. In the case of the valve 22, the center paths go to waste designated W, and in the case of the valve 26, the center paths connects with a line 70 extending from a diluent supply 72.

The pumps 56 and 62 may be of any construction, but preferably are manifolds having positive displacement pistons in them, moving from end to end and thereby displacing a volume of fluid. Each pump draws into itself at one end the same volume of fluid it is pushing out at the other end.

If it is assumed that the transfer valve 10 is in the condition shown in FIG. 1 with the center element 14 disposed so that the solid line portions of the conduits P9 and P10 are on the left aligned with the passageways shown, operation of the sample pump 56 by movement of its piston from bottom to top while the two paths P11' of the valve 22 are in use will enable a quantity of the liquid sample 38 to be drawn into the line 32 and 20 by way of the aligned passageways P1, P9 and P5. At the same time, any liquid which may have been in the upper end of the sample pump 56 is expelled to waste W by way of the line 58. The passageways P11 are blocked off at this time. The sample 38 fills the passageway P9 and when the center element 14 is moved to its alternate position, represented by the broken line position of the passageway P9, the volume of sample subtended will be aligned with the passageways P2 and P6.

The line 24 connects passageway P2 with the upper end of the diluent control valve 26, and prior to movement of the center element or member 14 to the second position, the solid portion of element 14 prevents communication between passageways P2 and P6. After movement of the center element 14 is completed, and passageway P9 is aligned with passageways P2 and P6 the control valve 26 is automatically operated to dispense a predetermined volume of diluent for making the first dilution or sample suspension of predetermined concentration.

The plug or subtended portion of sample 38 and diluent from the line 24 pass through the line 40 into chamber 42 of vessel 44. It will be appreciated that there is diluent in the line 40 ahead of the plug of sample 38 as well as behind it, derived from the line 24. Thus, the motion of the fluid entering vessel 44 effects a mixing operation. The total amount of liquid which flows into the mixing vessel 44 is equal to that displaced by pump 62. This is an accurately controlled amount, 10 cc. for example, and it pushes the plug of sample 38 into the chamber 42, washing out the aligned passageways P2, P9 and P6. The volume of the plug of sample 38 is determined by volume of the conduit P9, its exact volume being sufficient to produce the proper desired concentration, i.e., a 250 to 1 dilution.

The vessel 44 which is illustrated as having chambers 42 and 54, is completely empty when the sample commences to enter; the respective chambers being joined by conduit 100. Accordingly, while valve 102 remains closed the sample solution will fill chamber 54, and upon opening said valve 102 the sample solution will pass into the first testing apparatus 104.

At some time prior to the opening of valve 102, but after chamber 54 is filled to a pre-selected level, sample control valve 22 is shifted to align the internal passageways 11 with the lines 58 and 60, thereby connecting the line 30 with the passageways P4, P10 (the transfer valve assembly is in position No. 2) and P8. Accordingly, since line 52 dips into the dilution or sample suspension in chamber 54 and is connected to P8, actuation of the sample pump 56 draws a portion of the dilution into aligned passageways P4, P10 and P8. It should be noted that this movement purges the opposite end of the pump and any portion of sample 38 contained therein is expelled to waste.

A small plug of the dilution (concentration: one part fluid sample to about 250 parts diluent) is contained in the passageway P10 in position 2. Next, the center element 14 is indexed back to position No. 1 which realigns conduit P9 with passageways P1 and P5 and subtends a plug of the first dilution in passageway P10 and aligns and deposits same in passageways P3, P7. When position No. 1 has been reached, the diluent control valve 26 is operated to move to the position where it is arranged to dispense diluent by way of line 28. Diluent pump 62 is then automatically operated to force a predetermined amount of the diluent through the line 28, passageways P3, P10 and P7, and the line 46 into the vessel 50 to produce the second dilution, having determinable concentration.

It should be noted that vessels 50 and 44, as illustrated, are of the same type, employing a two-chamber construction; however, such need not be the case, and it is envisioned that single chamber vessels may be used. The same procedure for mixing goes on in vessel 50 as described in the case of the vessel 44. In passing through the fluid passages ways and lines described, the diluent from the control valve 26 pushed the plug of the first dilution out of the passageway P10 and rinses that passageway.

Once the second dilution is received in vessel 50, the valve 102' may be operated automatically to transfer a portion of the second suspension to the second testing apparatus, designated generally 108. As illustrated in FIG. 1, once the various testing operations have been performed the sample suspension enters line 110, and is rinsed or otherwise transported to waste.

To review briefly the operation of the device, initially the condition of transfer valve 10 is that it is disposed in position No. 1, and a quantity of fluid sample Δ8 is drawn into conduit P9. Upon movement of the center 14 to position No. 2 a slug of fluid sample 38 is subtended and mixed with a predetermined volume of diluent to produce the first dilution. Next, with center element still in position No. 2, a quantity of the first sample suspension is drawn into conduit P10. Upon movement of the element 14 back to position No. 1, a slug of the first suspension is subtended and mixed with a predetermined volume of diluent to produce a second sample suspension. Thus, when it is kept in mind that a continuously operating, automatic diluting apparatus is envisioned it can be seen that when the center element 14 is indexed from position No. 2 back to position No. 1 to produce a second dilution with regard to a first fluid sample another fluid sample will be drawn into conduit P9 in preparation for the first diluting operation.

The passageways P9 and P10 are formed by suitable holes drilled in the plate 14, and these are centered as shown, their length being controlled by the thickness of the center element 14, taken through the arcuate projections 260 and 260' located respectively at each passageway. It must be noted at this point that the volume of passageways P9 and P10 must be accurately determined, and great care must be exercised in the drilling of these passageways.

The projections 260 are on the left at the passageway P9 and the projections 260' are at the right at passageway P10. These projections are carefully ground and lapped to provide smooth bearing surfaces for the relative movement between center plate 14 and the upper and lower plates 12 and 16. The portions of passageways P1 through P8 which are contiguous to projections 260 and 260' are formed in synthetic resin members inset in the inner faces of the outer members 12 and 16. These synthetic resin members are designated 262, 264, 266 and 268, respectively, and are shown in FIG. 5 and provide a certain degree of resilience enabling fluid tight movement. The particular resin employed should be resistant to the liquids used and tough enough to prevent cold flow. Resins containing tetrafluoroethylene would be suitable, and several are commercially available. Each of the synthetic resin members has a carefully dimensioned arcuate bearing surface, as for example, those shown in FIG. 8 at 270 and 272, cooperating with respective projections 260 and 260'.

In FIGS. 3 and 4, respectively, position Nos. 1 and 2 are illustrated. When the transfer valve 10 is in the condition represented as position No. 1, FIG. 3, the arm 258 will be to the left as shown, and the post 252 will engage the right hand end of slot 254. In position No. 2 the arm 258 is to the left as shown in FIG. 4, and the post 252 engages the left hand end of slot 254. Accordingly, it can be seen that the arcuate length of slot 254 defines the limits of pivotal movement of the center element 14 regarding the respective positions Nos. 1 and 2. When the valve is in position No. 1, conduit P9 is aligned with passageways, P1 and P5, while conduit P10 is aligned with passageways P3 and P7. In this position the solid, unapertured portion of projections 260 and 260' block the passageways P2, P6 and P4, P8, respective. Upon indexing the valve 10 to position No. 2, it can be seen that the situation is then reversed; that is, conduit P9 aligns with passageways P2, P6, and conduit P10 aligns with passageways P4, P8, while the passageways P1, P5 and P3, P7 are then blocked.

FIG. 5 is a sectional view taken along the line 5—5 of FIG. 3, and illustrates the valve 10 in position No. 1. In this regard it easily is seen how the conduits P9 and P10 align with the passageways formed in the outer plate members 12 and 16.

Turning now to FIGS. 6–10, there is illustrated a modified form of transfer valve structure, designated generally 10', and capable of being used with the hereinbefore discussed diluting system. Since many of the elements of the embodiment of FIGS. 6–10, are similar to those of the previously discussed transfer valve 10, these elements will be designated with like reference characters, primed.

In FIG. 6, the modified transfer valve structure 10' is illustrated in assembly, while in FIG. 7, said valve has been exploded. Basically, the overall arrangement of valve 10' corresponds to that of transfer valve 10, but it should be noted that the positions of the elements 12' and 16' have been reversed with respect to their counterparts of valve 10 as illustrated. Accordingly, this reversal should be kept in mind in comparing the two transfer valve structures.

The valve 10' includes an intermediate or center element 14' movable with respect to stationary outer elements 12' and 16'. The element 16' has passageways P1', P2', P3', and P4' formed therein, while the element 12' carries the passageways P5', P6', P7' and P8'. The intermediate or center element 14', like the center element 14, of the previously discussed embodiment, has conduits P9' and P10' formed therein.

The operation of the transfer valve 10' and the alignment of the respective passageways are identical to those same operations ocurring in the valve 10, previously discussed, said discussion being incorporated herein by reference. In this regard, the fluid lines illustrated in FIG. 6, bear primed reference characters corresponding to those of the fluid lines discussed in regard to the general concept of the invention schematically illustrated in FIG. 1.

The embodiment of FIGS. 6–10 differs from that of FIGS. 2–5 primarily in the overall construction of the individual valve elements. In this regard, instead of being of rectangular configuration, the elements 12', 14', and 16' are cylindrical with centrally disposed mounting apertures. Accordingly, instead of having the respective valve position to the right or left of axis 18, as in valve 10, the first and second portions of valve 10' are diametrically opposed with respect to the axis of the mounting spindle 300.

Considering FIG. 1 by way of comparsion, and viewing FIG. 7, the elements 12', 14' and 16' are supported by a spindle or shaft 300 which extends out of a stationary mounting plate 302. Spindle 300 is rotatable relative to the stationary mounting plate 302, and while primarily of cylindrical configuration, said spindle includes a portion 304 of rectangular cross section disposed axially inward of the spindle end. In addition, mounting plate 302 carries a stationary rectangular block-like member 306, as illustrated.

In the assembled state, the respective elements 12', 14' and 16' are disposed or strung on spindle 300 such that elements 12' and 16' with their circular mounting apertures engage the cylindrical portions of the spindle, while intermediate element 14' with its rectangular mounting aperture 308 is received by the rectangular spindle portion 304. The respective valve elements are held in assembly on spindle 300 by bolt 312, the threaded end of which passes through spindle 300 and is engaged in or by a spring-biased nut arrangement on the opposite side of plate 302, (not shown). The effect of this construction is that spindle 300 is free to rotate relative to plate 302 and bolt 312, while the spring-biased nut arrangement (not shown) tends to force the juxtaposed surfaces of the valve elements into fluid-tight contact.

To provide for the requisite movement of the intermediate element 14' relative to outer elements 12' and 16', said last named outer elements are each provided with a notch 310. The respective notches 310, of which only that in element 16' is visible in FIG. 7, closely receive the stationry member 306 and thus preclude movement of the outer members reltaive thereto. Intermediate element 14' is provided with a notch 314 of considerable circumferential length which also receives member 306; accordingly said element is free to move with respect to member 306, within certain defined limits.

Thus when valve 10' is assembled as discussed above it is believed clear that rotary movement of spindle 300 will cause the intermediate element 14' to rotate therewith and relative to outer valve elements 12' and 16', due to the disposition of rectangular portions 304 in the like-shaped aperture 308. Since this rotary movement is limited by the engagement of member 306 in notch 314, two positions are defined. The first illustrated in FIG. 8, and corresponding to the previously discussed position No. 1, while the second position, FIG. 9 corresponds to position No. 2 discussed above.

In addition, a cover or shield 320 is illustrated in FIG. 7. The shield 320 is engaged telescopically over the valve 10', with the slotted portion 322 receiving the member 306. With the shield 320 in place any spray or leakage during the operation of the valve is confined.

As will be recalled with regard to the discussion of transfer valve 10, the center element 14 includes machined projections 260 and 260', while elements 12 and 16 carried synthetic resin members or inserts 262, 264, 266 and 268, all of which cooperated to provide smooth, friction free operation. The transfer valve 10' is similarly constructed, and this will be discussed with regard to FIG. 10.

In FIG. 10, it can be seen that the respective valve elements 12' and 16' are of two-piece construction, each including a metal member 330 and a synthetic resin member 332, with the various passageways as illustrated. Intermediate element 14' is preferably of metal, and the surfaces thereof which engage the synthetic resin members 332 are machined and polished to reduce friction during relative movement between the illustrated position, position No. 1, and the second position.

It is believed apparent that considerable variations and substitutions of equivalents are capable of being made without in any way departing from the spirit and scope of the invention as defined in the appended claims.

What is desired to secure by Letters Patent of the United States is:

1. A diluting system for providing a plurality of dilutions of differing concentration from a single fluid sample, said diluting system comprising: a transfer valve having a first portion for receiving and isolating therein an amount of the fluid sample and for combining said amount of sample with a first volume of a diluent to produce a precise desired first dilution; a vessel for receiving said first dilution; a second transfer valve portion coupled to said vessel for receiving and isolating therein an amount of said first dilution and for combining said amount with a second quanttiy of diluent to produce a precise desired second dilution; and means for introducing said fluid sample and said first dilution into the first valve portion and the second valve portion, respectively.

2. A system in claim 1 wherein said transfer valve includes a plurality of elements in face-to-face contact, at least one of which is movable relative to the remainder of the valve between a first position and a second position, the said first valve portion including; a conduit formed in said movable element, ports defining a pair of fluid passageways in the remainder of the valve structure; whereby when said movable valve element is in said first position said conduit is in communication with one of said fluid passageways and said element blocks the other fluid passageway, indexing of the movable valve element to the second position aligns said conduit with said other fluid passageway while said conduit subtends an amount of fluid sample and positions said amount for combining with the diluent to produce the first precise desired dilution.

3. A diluting system as defined in claim 2 wherein said second transfer valve portion is of like construction with respect to said first portion, the fluid passageways of said second valve portion are so connected that a portion of the first precise dilution may be transferred from said vessel into said second valve portion while said movable member is in the second position, indexing to said first position subtends an amount of said first dilution portion and positions same for combining with diluent to produce the second precise dilution.

4. A diluting system as defined in claim 1 wherein the transfer valve includes a pair of outer members and a central member movable relative thereto, said outer member being engaged against opposite faces of said central member, means for limiting the movement of said central member, to define first and second positions thereof, said first valve portion including; a conduit formed in said central member and arranged to open to the opposite faces thereof, a pair of ports on each of said outer members arranged such that the ports of one outer member are coaxial with those of said other outer member to define two fluid paths, such that when said central member is in the first position said conduit is positioned between one pair of aligned ports, with the central member blocking the other pair of aligned ports whereby, indexing of said central member to said second position aligns said conduit with said other pair of ports while subtending an amount of said sample and depositing same in the fluid path defined thereby for combining with the diluent; said second valve portion being of like construction with regard to said first portion, and including a conduit and a pair of ports defining first and second fluid paths, such that when said central member is in the second position a specimen of the first dilution may be introduced into the conduit of the second valve portion, whereby, indexing of the central member from said second position back to the first position subtends an amount of the first precise dilution and positions same for mixing with diluent to provide the second precise dilution.

5. A system as defined in claim 1 wherein said transfer valve comprises a pair of outer members and a central member disposed therebetween and movable relative thereto, the outer members being engaged against the opposite faces of said central member, said first and second valve portions being of like construction and each portion including; a conduit formed in said central member, two pairs of aligned passages formed in said outer members, whereby, said central member may be moved selectively to interconnect one of said pair of aligned passages through said conduit while simultaneously blocking the other of said pair of passages.

6. A diluting system for producing a plurality of dilutions from the same fluid sample, said system including;
   (A) sample drawing means having
      (i) a double acting sample pump having two ports serving as intake and exhaust means for said pump,
      (ii) a first control valve for the double acting sample pump,
   (B) diluent dispensing means having
      (i) a positive displacement diluent pump having a predetermined displacement volume,
      (ii) conduits connecting said diluent pump with a source of diluent,
      (iii) ports in said pump communicating between the interior of said pump and with said diluent source, and between the interior of said pump and a discharge conduit, and
      (iv) a second control valve for said diluent pump,
   (C) a mixing vessel for receiving the first dilution,
   (D) fluid transfer valve means for combining the actions of said pumps to provide two separate dilutions from the same fluid sample comprising;
      (i) a central member sandwiched between two outer members,
      (ii) means for moving the central sandwiched member relative to the two outer members in a limited movement between two positions,
      (iii) first and second conduits in the central member and each having two positions corresponding to the two positions of movement, each conduit having a predetermined length subtended between the outer members,
      (iv) the outer members having four sets of ports,
         (a) a first set adapted to be aligned with said first conduit at said first position and adapted to be blocked at said second position,
         (b) a second set adapted to be blocked at said first position but aligned with said first conduit at said second position,
         (c) a third set adapted to be aligned with said second conduit at said first position and adapted to be blocked at said second position, and
         (d) a fourth set of ports adapted to be aligned with said second conduit at said second position and adapted to be blocked at said first position,
   (E) fluid conducting means cooperating with said transfer valve comprising,
      (i) first fluid lines connecting the first set of ports with said sample drawing means and external sample source,
      (ii) second fluid lines connecting the second set of ports with the mixing vessel and the diluent dispensing means,
      (iii) third fluid lines connecting the third set of ports with the mixing vessel and the sample drawing means,
      (iv) fourth fluid lines connecting the fourth set of ports with said diluent supply,
   whereby, when said central member of the transfer valve is in the first position, a sample is drawn into said first conduit by way of said first fluid lines and said sample drawing means, movement of the central member to the second position subtending a precise amount of sample and placing the first conduit in alignment with said second set of ports so that a predetermined volume of diluent may be discharged from said diluent dispensing means into said second fluid lines to produce a first dilution which is then received in said vessel, with the valve transfer valves still in said second position a portion of the first dilution is then drawn into said third fluid lines and said second conduit by way of said sample drawing means such that when said transfer valve is returned to the first position a slug of first diluent will be captured and moved into alignment with said fourth set of ports and mixed with a diluent for said diluent dispensing means to provide a second dilution of considerably weaker strength than said first dilution.

7. A transfer valve for use in an automatic diluting system wherein a plurality of dilutions are produced from a single fluid sample, said valve comprising: a central member; a pair of outer members engaged against opposite faces of said central member to sandwich same therebetween; said central member being movable relative to said outer members between a first and a second position, first and second conduits formed in said central member; four ports provided in each outer member such that each of the ports in one of said outer members aligns with a port in the other of said outer members to define four fluid paths, two of said paths being associated with each conduit; whereby, said central member may be indexed to the first position to align said first conduit with one of its associated fluid paths for reception of a portion of the fluid sample, such that movement of the central member to the second position subtends an amount of said sample and deposits same in the second fluid path associated with said first conduit for combining with a diluent to provide a precise first dilution; said second conduit being aligned with one of its associated fluid paths and adapted for reception of a portion of said first dilution when the central member is in the second position such that indexing of the central member back to said first position aligns said second conduit with the other of its associated fluid paths and subtends an amount of said first dilution for combining with a diluent to provide a second precise dilution of substantially less strength than said first dilution.

8. A transfer valve as defined in claim 7 wherein said central member and outer members having planar interengaging bearing surfaces, the bearing surfaces of said outer members being defined by synthetic resin elements which define a portion of each of said ports.

9. A transfer valve as defined in claim 7, further including; a stationary mounting plate, a spindle rotatable relative to said mounting plate and having a non-circular portion disposed between a pair of circular portions, said outer members being apertured and engaged upon said spindle contiguous to said circular portions, the central member being engaged upon said non-circular portion and having an aperture of like shape, and means associated with the mounting plate for fixing the position of said outer members relative thereto whereby said spindle may be rotated to move the central member relative to said outer members.

10. A transfer valve for use in making dilutions, said valve including an assembly having a pair of outer members and a central member, the outer members being secured together and engaged against the opposite faces of said central member in fluid tight relationship, pivot means in the assembly for providing pivotal swinging of the central member relative to the outer members on an axis normal to the opposite faces of said central member, a pair of spaced apart conduits formed in said central members and each arranged to open to said opposite faces, means for confining the swinging movement of said central member to a predetermined arc, the terminal location at the ends of said arc defining first and second positions of said central member, each outer member having two pairs of ports, one of said conduits connecting one port of one pair of each outer member through itself when said central member is in one position while communication through said central member between the second port of said one pair of each outer member is blocked, the second of said passageways connecting one port of the second pair of each outer member through itself when said central member is in said one position while communication through said central member between the second port of said second pair of each outer member is blocked, the connections of conduits with the respective second ports of each pair and the blocking of the first ports being effected when said central memer is in said second position, whereby, said conduits are adapted to receive fluid samples, such that upon movement of said central member an amount of said fluid will be subtended and positioned for combining with a diluent.

11. The transfer valve of claim 10 in which said central member and outer members have interengaging bearing surfaces formed at their faces of engagement protruding from the respective members to present a minimum of friction.

12. The transfer valve of claim 11 in which the bearing surfaces of the outer members are formed of pads of semi-resilient synthetic material secured to said outer members.

13. The transfer valve of claim 12 in which the bearing surfaces of said central member are arcuate protrusions.

14. The transfer valve of claim 10 in which said confining means comprise an arcuate slot and pin connection between the central member and the outer members.

15. A transfer valve for use in an automatic diluting system, said valve comprising: a central member; a pair of outer members engaged against opposite faces of said central member to sandwich same therebetween; said central member being movable relative to said outer members between a first and a second position, at least one conduit formed in said central member; at least a pair of ports provided in each outer member such that each of the ports in one of said outer members aligns with a port in the other of said outer members to define at least two fluid paths; whereby, said central member may be indexed to the first position to align said one conduit with one of said fluid paths for reception in said one conduit of a portion of the fluid sample, such that movement of the central member to the second position subtends in its said conduit an amount of said sample and deposits same in the other fluid path for combining with a diluent to provide a precise dilution.

References Cited

UNITED STATES PATENTS

| 3,012,863 | 12/1961 | Feichtmeir | 23—259X |
| 3,192,968 | 7/1965 | Baruch et al. | 23—259X |
| 3,192,969 | 7/1965 | Baruch et al. | 23—259X |
| 3,193,358 | 7/1965 | Baruch | 23—253 |
| 3,193,359 | 7/1965 | Baruch et al. | 23—253X |

MORRIS O. WOLK, Primary Examiner

R. E. SERWIN, Assistant Examiner

U.S. Cl. X.R.

23—259; 73—421